United States Patent
Chodem et al.

(10) Patent No.: US 11,748,027 B2
(45) Date of Patent: Sep. 5, 2023

(54) STORAGE SYSTEM AND METHOD FOR AVOIDING CLUSTERING OF READS DURING A PROGRAM SUSPEND

(71) Applicant: Western Digital Technologies, Inc., San Jose, CA (US)

(72) Inventors: Nagi Reddy Chodem, Bangalore (IN); Evangelos Vazaios, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 14 days.

(21) Appl. No.: 17/565,768

(22) Filed: Dec. 30, 2021

(65) Prior Publication Data

US 2023/0214147 A1 Jul. 6, 2023

(51) Int. Cl.
*G06F 12/00* (2006.01)
*G06F 3/06* (2006.01)

(52) U.S. Cl.
CPC .......... *G06F 3/0655* (2013.01); *G06F 3/0611* (2013.01); *G06F 3/0679* (2013.01)

(58) Field of Classification Search
CPC ..... G06F 3/0655; G06F 3/0611; G06F 3/0679
See application file for complete search history.

(56) References Cited

U.S. PATENT DOCUMENTS

| | | | | |
|---|---|---|---|---|
| 9,812,200 B2* | 11/2017 | Intrater | ............... | G11C 13/004 |
| 2016/0313946 A1* | 10/2016 | Zang | ..................... | G06F 3/0611 |
| 2019/0004710 A1* | 1/2019 | Ebsen | ................... | G06F 3/0679 |
| 2019/0243577 A1* | 8/2019 | Pelster | .................. | G06F 3/0659 |
| 2020/0273523 A1* | 8/2020 | Donati | .................. | G11C 16/32 |
| 2020/0303012 A1* | 9/2020 | Nishikawa | ............. | G11C 16/16 |
| 2021/0271409 A1* | 9/2021 | Ben-Rubi | ............. | G06F 3/0659 |
| 2021/0382652 A1* | 12/2021 | Sharma | ................. | G06F 3/0613 |
| 2022/0057966 A1* | 2/2022 | Kanno | .................. | G06F 3/0688 |
| 2022/0208273 A1* | 6/2022 | Siciliani | ................ | G11C 7/106 |

\* cited by examiner

*Primary Examiner* — David Yi
*Assistant Examiner* — Tahilba O Puche
(74) *Attorney, Agent, or Firm* — Crowell & Moring LLP

(57) ABSTRACT

A storage system suspends an ongoing program operation to execute a read command. There is a limit on the number of times the storage system can suspend the program operation, and latencies occur for read commands that are received after the limit has been reached. To improve read quality of service, a blackout window is established that prevents the storage system from suspending the program operation for a period of time after the program operation resumes. The period of time can be chosen such that program suspensions are evenly distributed over the course of the program operation.

14 Claims, 13 Drawing Sheets

STORAGE SYSTEM AND METHOD FOR AVOIDING CLUSTERING OF READS DURING A PROGRAM SUSPEND

BACKGROUND

A storage system may be requested to read its memory while the memory is undergoing a program operation. In such a situation, the storage system can suspend the program operation to service the read request. The number of times in which the storage system can suspend the program operation may be limited. So, in some situations, an incoming read command may not be serviced until the ongoing program operation is completed, which can result in high read latency.

DETAILED DESCRIPTION

The following embodiments generally relate to a storage system and method for avoiding clustering of reads during a program suspend to improve read quality of service. In one embodiment, a storage system is presented comprising a memory and a controller. The controller is configured to receive a read command while the memory is undergoing a program operation; suspend the program operation to execute the read command; and prevent the program operation from being suspended again for a period of time. In another embodiment, a method is provided that is performed in a memory of a storage system comprising a controller. The method comprises receiving a command from the controller to suspend a program operation to execute a read command; receiving a command from the controller to resume the program operation, wherein the command provides the memory with a blackout window during which the memory is prevented from suspending the program operation again; and providing the controller with a remaining time in the blackout window in response to receiving a status check request from the controller. In yet another embodiment, a storage system is provided comprising a memory; means for suspending a program operation to execute a read command; and means for preventing the program operation from being suspended again for a period of time. Other embodiments are provided and can be used alone or in combination.

Figure 1A:
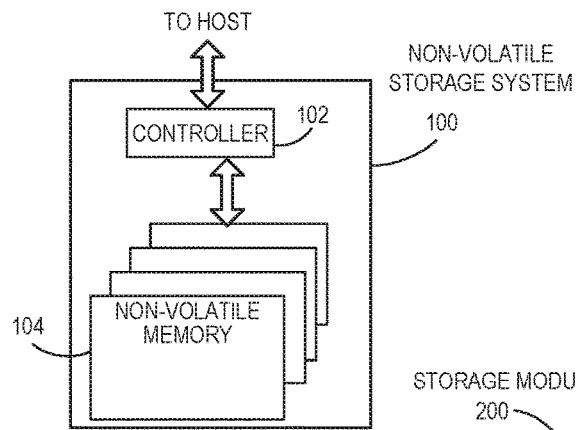
FIG. 1A is a block diagram of a non-volatile storage system of an embodiment.

Turning now to the drawings, storage systems suitable for use in implementing aspects of these embodiments are shown in FIGS. 1A-IC. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magneto-resistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory cells that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including ReRAM, MRAM, PCM, NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), quad-level cell (QLC) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card-based system, such as a secure digital (SD) or a micro secure digital (micro-SD) card (or USB, SSD, etc.). In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

Figure 1B:
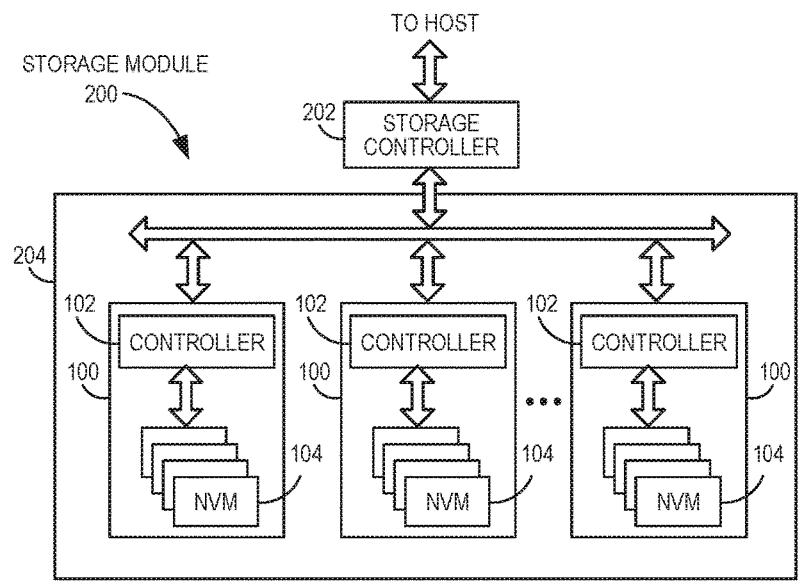
FIG. 1B is a block diagram illustrating a storage module of an embodiment.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid-state drive (SSD), or non-volatile dual in-line memory module (NVDIMM), such as found in server PC or portable computing devices, such as laptop computers, and tablet computers.

Figure 1C:
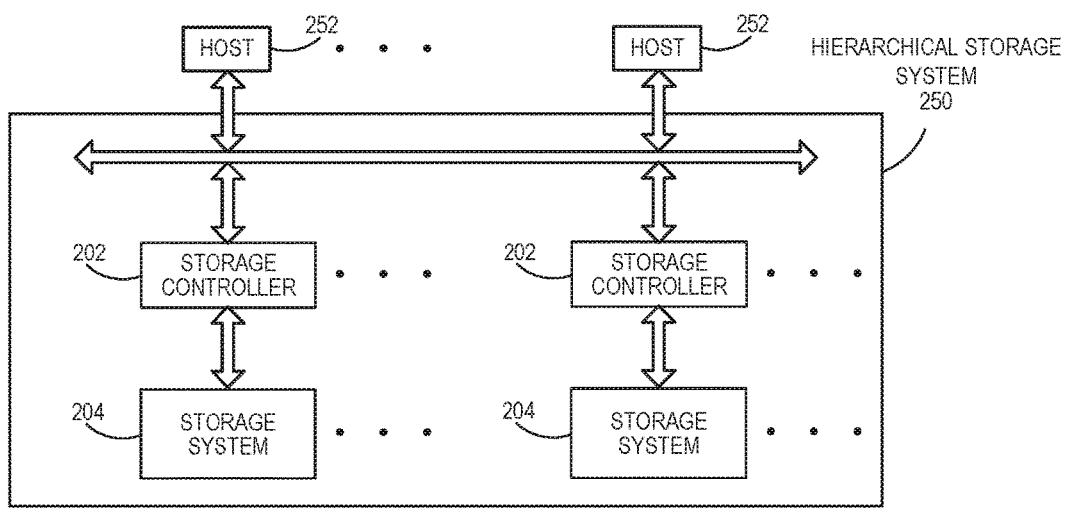
FIG. 1C is a block diagram illustrating a hierarchical storage system of an embodiment.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
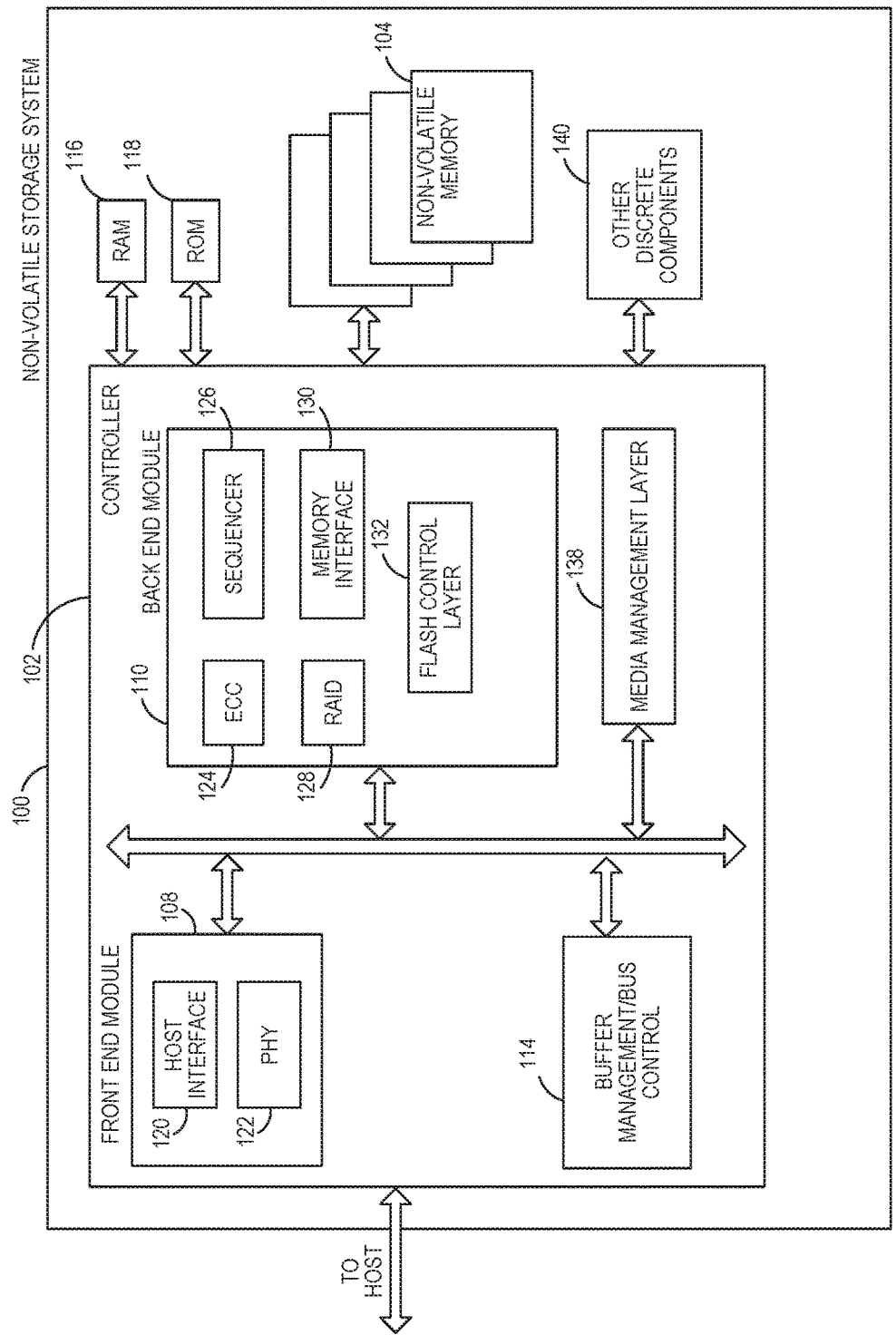
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
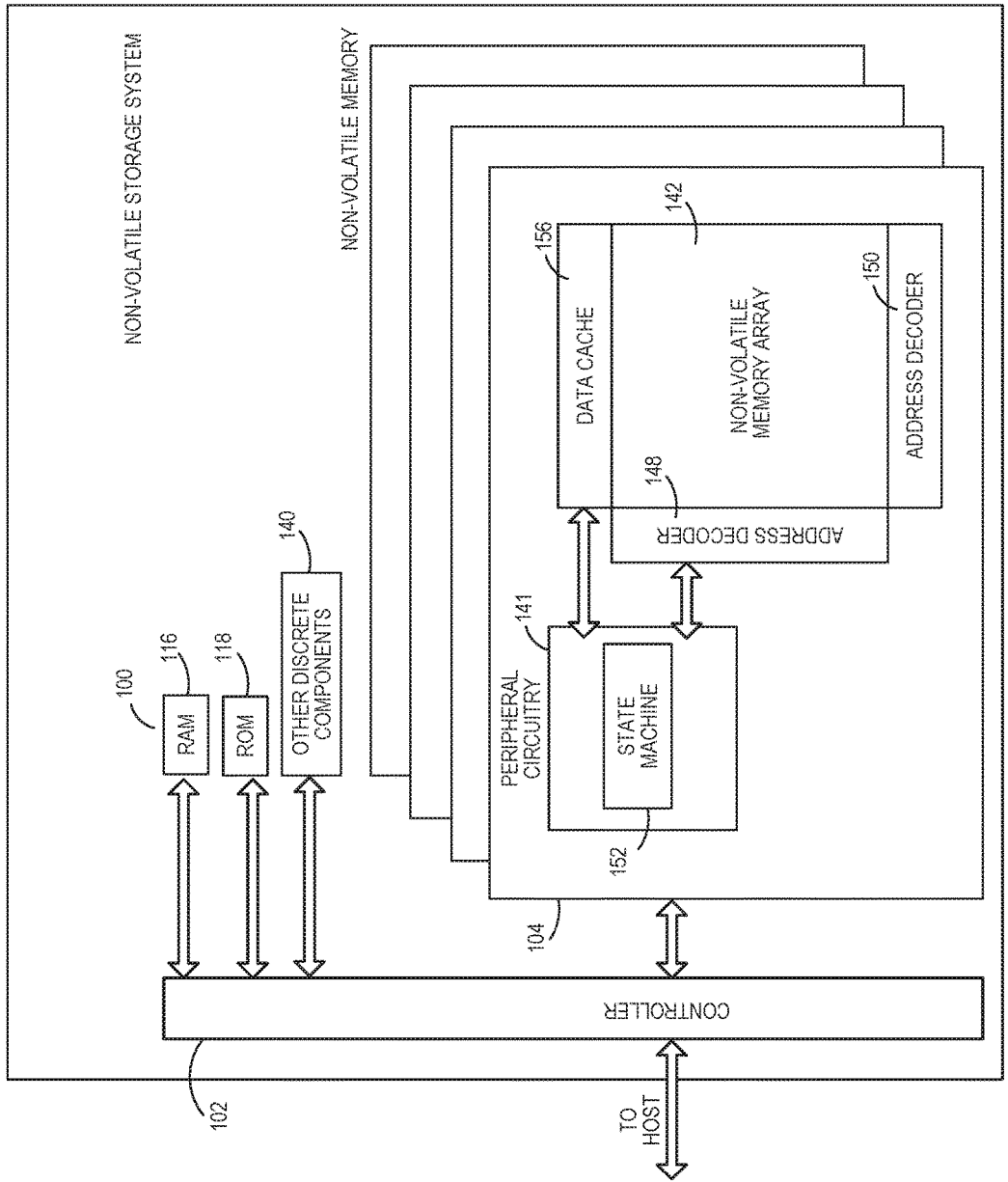
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block of memory cells. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
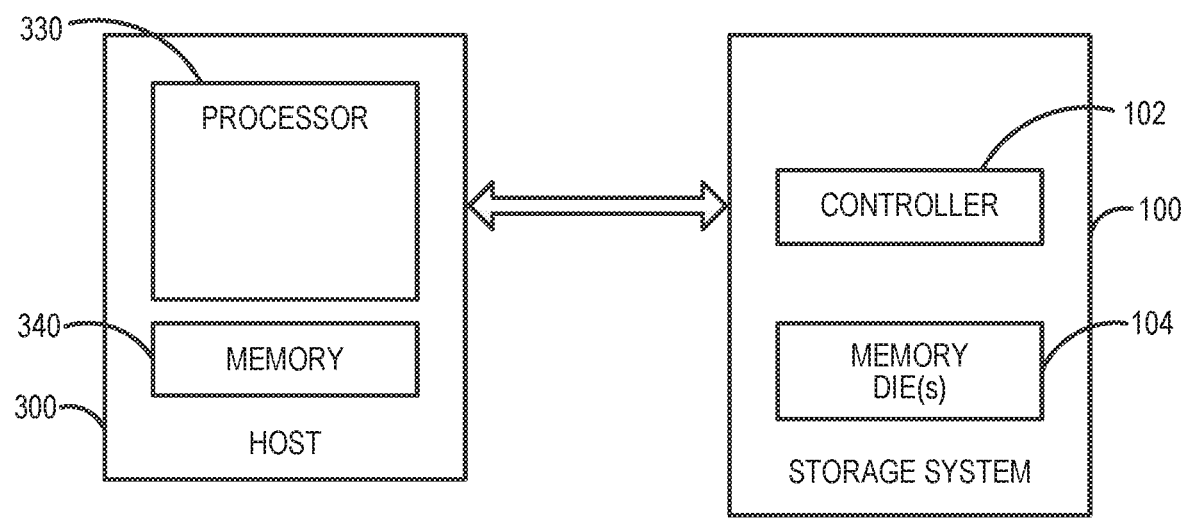
FIG. 3 is a block diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340 (e.g., DRAM)) to the storage system 100 for storage in the storage system's memory 104 (e.g., non-volatile memory dies). While the host 300 and the storage system 100 are shown as separate boxes in FIG. 3, it should be noted that the storage system 100 can be integrated in the host 300, the storage system 100 can be removably connected to the host 300, and the storage system 100 and host 300 can communicate over a network. It should also be noted that the memory 104 can be integrated in the storage system 100 or removably connected to the storage system 100.

A "mixed workload" refers to the situation in which the storage system 100 is servicing both read and write commands. If the host 300 is requesting a read of a memory die that is undergoing a write (program) operation, the program operation would need to be suspended to service the read operation. Depending on the host workload (e.g., locality of reads, ratio of read and write commands, etc.), there can be different demands for suspending a program operation during the lifecycle of the memory 104.

Figure 4:
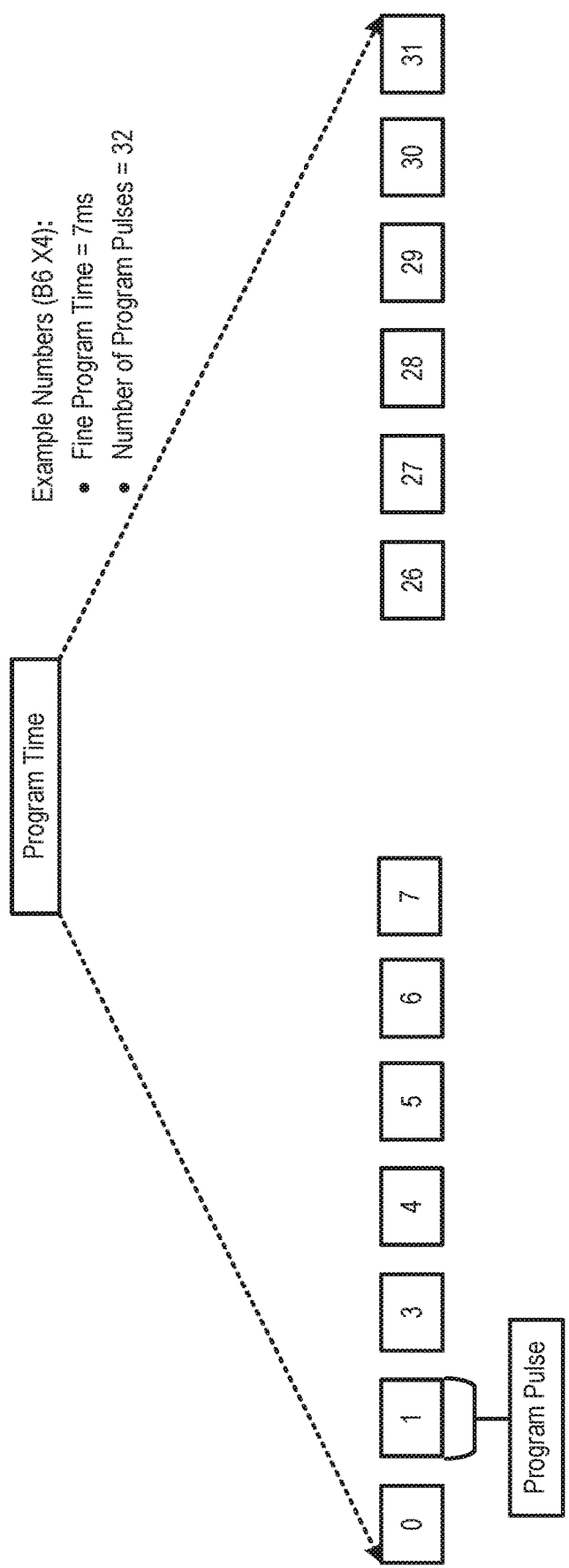
FIG. 4 is an illustration of a programming cycle of an embodiment.
Figure 5:
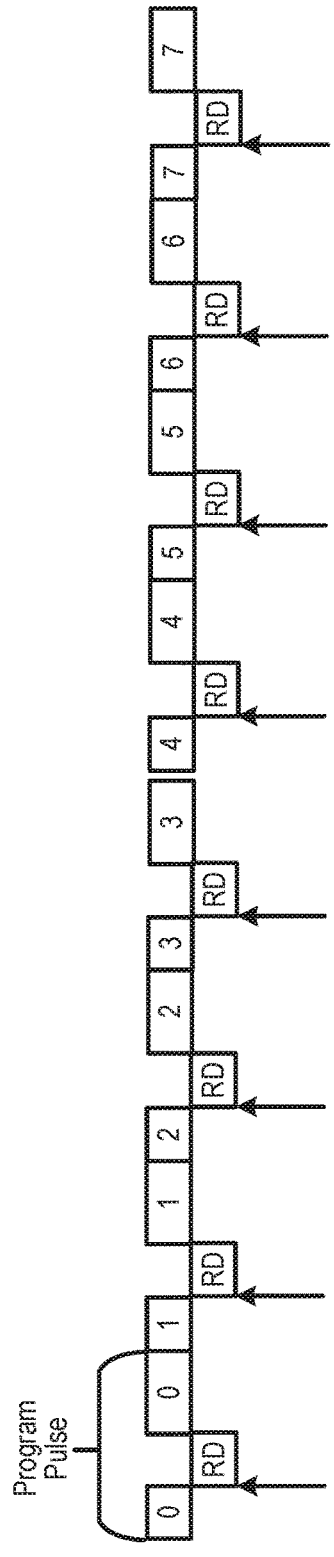
FIG. 5 is an illustration of example distributions of read suspends of an embodiment.
Figure 5:
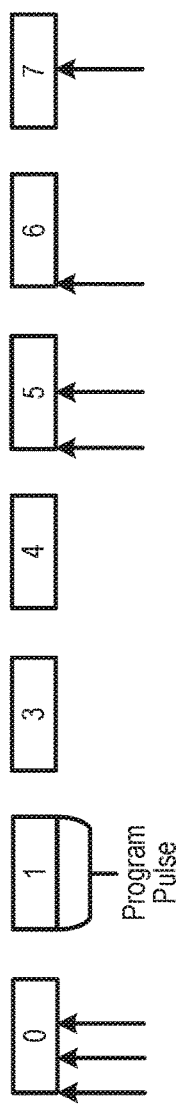
Figure 5:
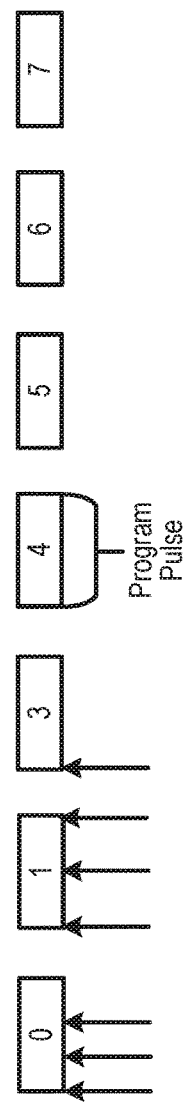

As shown in FIG. 4, a write (program) operation comprises a series of pulses/loops, and the number of times that they can be suspended is limited due to system performance and memory reliability. Reads can be distributed throughout the program cycle in several ways. For example, as shown in FIG. 5, reads can be evenly or unevenly distributed and can be clustered during early stages of the program cycle.

Figure 6:
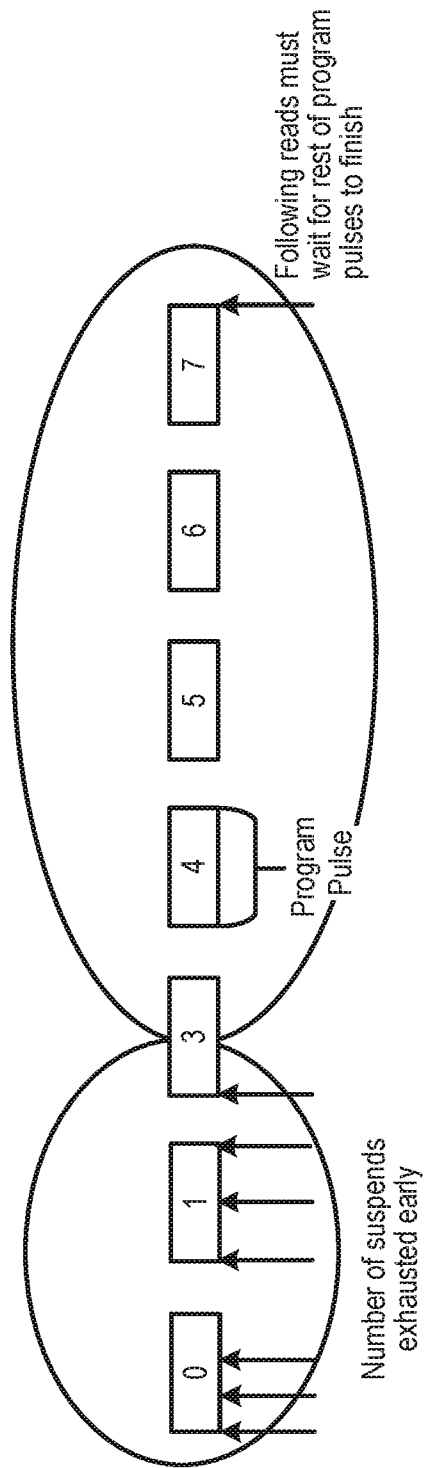
FIG. 6 is an illustration of a problem that can occur when there are a limited number of suspends and a high number of reads to a memory die.

Even if the memory 104 allows a large number of suspending reads, suspending the program operation a large number of times can cause a reduction in the storage system's write performance. So, due to reliability reasons, the number of times that a program can be suspended can be limited. With a limited number of suspends and a high number of reads to a memory die, suspends clustered during initial stages of program can lead to large latency tails of reads. That is, in workloads where there is a high rate of read arrivals to each die, the number of suspends can be exhausted quickly, and, after the last-allowed suspend, the next read that arrives will have to wait until the end of the program operation. This, combined with the long QLC fine program time compared to TLC program time, can lead to long read-tail latencies. This problem is illustrated in FIG. 6. To deal with this problem, the number of suspends per program can be scaled with program time. However, a large number of suspends can adversely affect the reliability of the memory 104 and even impact system level performance, if such scaling is even possible.

The following embodiments provide a solution to this problem. In one embodiment, the controller 102 of the storage system 100 prevents sending another suspend read operation for a certain time period ("blackout window") after a program is resumed. This solution prevents clustering of suspending operations during early stages of a program operation. The blackout window method effectively limits the maximum read latency, thereby improving read latency for different read-write ratio mixed workloads.

Figure 7:
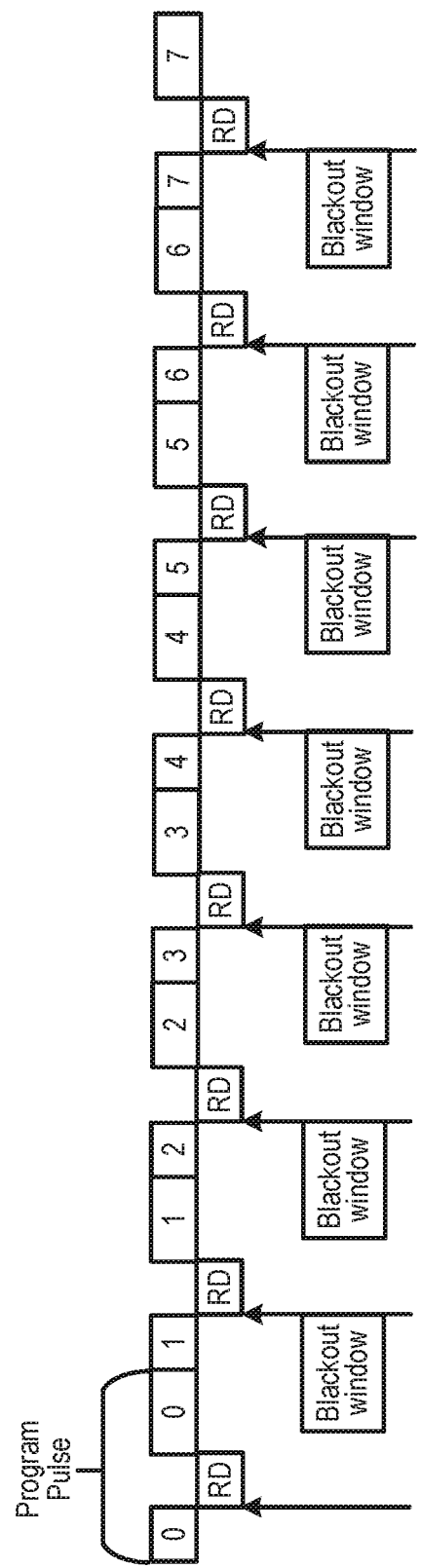
FIG. 7 is an illustration of a method of an embodiment in which reads are evenly distributed across a program operation with a blackout window.

FIG. 7 illustrates this embodiment. As shown in FIG. 7, in this embodiments, suspensions of the program cycle to perform reads are evenly distributed reads across the entire length of program time. This prevents early clustering of suspends by not allowing another suspend for a certain amount of time (the blackout window) after a program is resumed. So, using a blackout window allows suspends to be evenly distributed, prevents early exhaustion of the suspends, and spreads the servicing of the reads evenly across the programming cycle, thus reducing long read tail latencies.

The length of the blackout window, which can be pre-calculated or calculated on-the-fly, can be chosen in any suitable way and can depend on one or more memory parameters. The length of blackout window can be tunable for different memory nodes and adjusted to the allowed number of suspends for a program. For example (but in no way a limitation on the claims), the following formula can be used to calculate the length of the blackout window:

$$\text{blackout\_window} = \frac{t_{prog}}{\text{number\_suspends}} - \frac{\text{t\_pulse}}{2} + \text{t\_prog\_resume}$$

Figure 8:
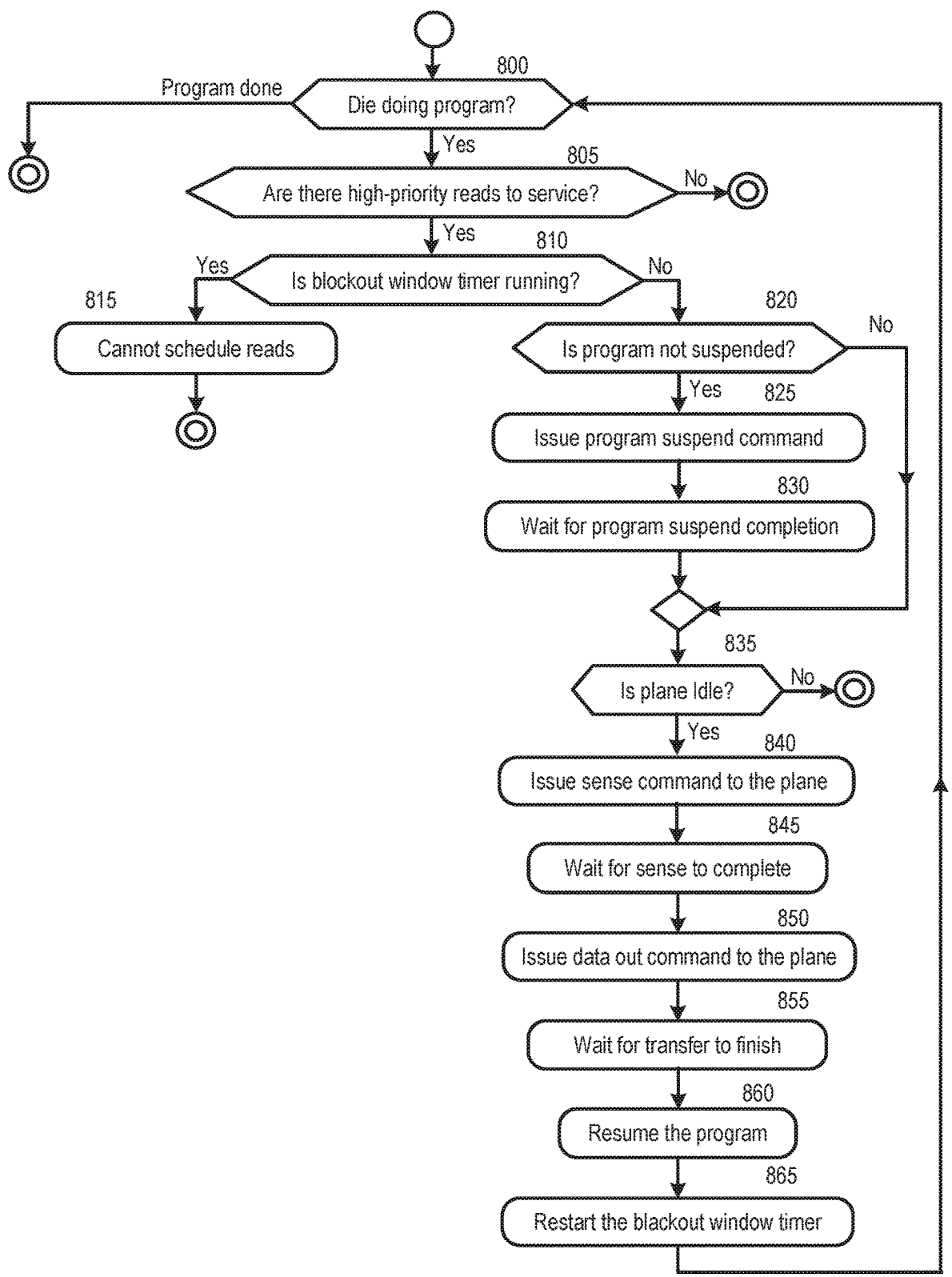
FIG. 8 is a flow chart of a method of an embodiment for avoiding clustering of reads during a program suspend to improve read quality of service.
Figure 9:
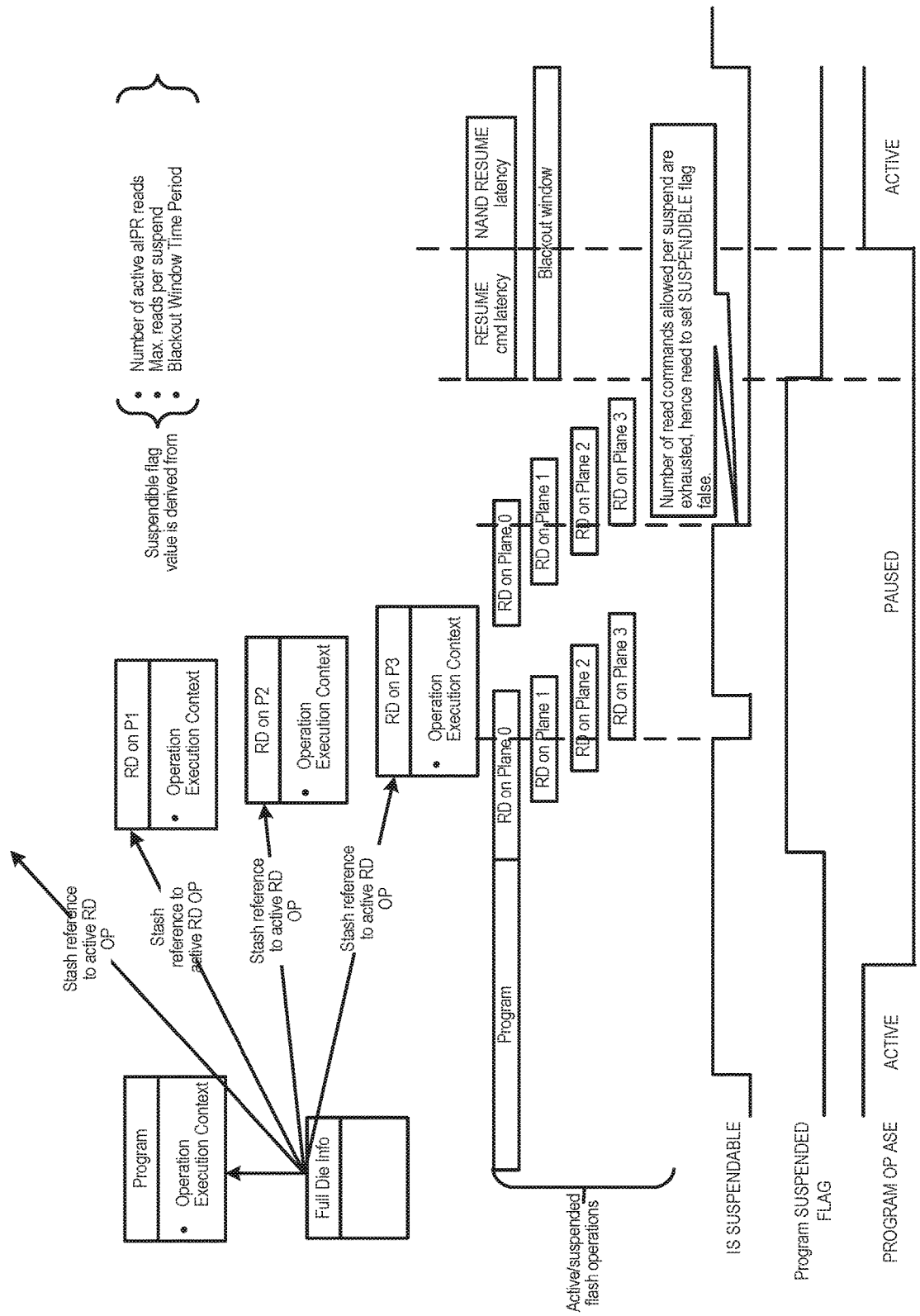
FIG. 9 is an activity diagram of an embodiment.

Turning again to the drawings, FIG. 8 is a flow chart of a method that can be implemented in software, firmware, and/or hardware of the controller 102. As shown in FIG. 8, the controller 102 first determines if the memory 104 (e.g., a die) is undergoing a programming operation (act 800). If the memory 104 is undergoing a programming operation, the controller 102 determines if there are high-priority reads to service (act 805). If there are, the controller 102 determines if a blackout window timer is running (act 810). If the blackout window timer is running, the controller 102 cannot schedule the read (act 815). However, if the blackout window timer is not running, the controller 102 determines whether the programming operation is suspended (act 820). If the program operation is not suspended, the controller 102 issues a program suspend command (act 825) and waits for the program suspend to be completed (act 830). After the program suspend is completed, the controller 102 determines if the memory plane is idle (act 835). If the memory plane is idle, the controller 102 issues a sense command to the memory plane to read the data (act 840) and waits for the sense to be completed (act 845). The controller 102 then issues the data out of the memory plane (act 850) and waits for the transfer to finish (act 855). The controller 102 then resumes the program operation (act 860) and restarts the blackout timer (act 865). FIG. 9 is an activity diagram for this process.

Figure 10:
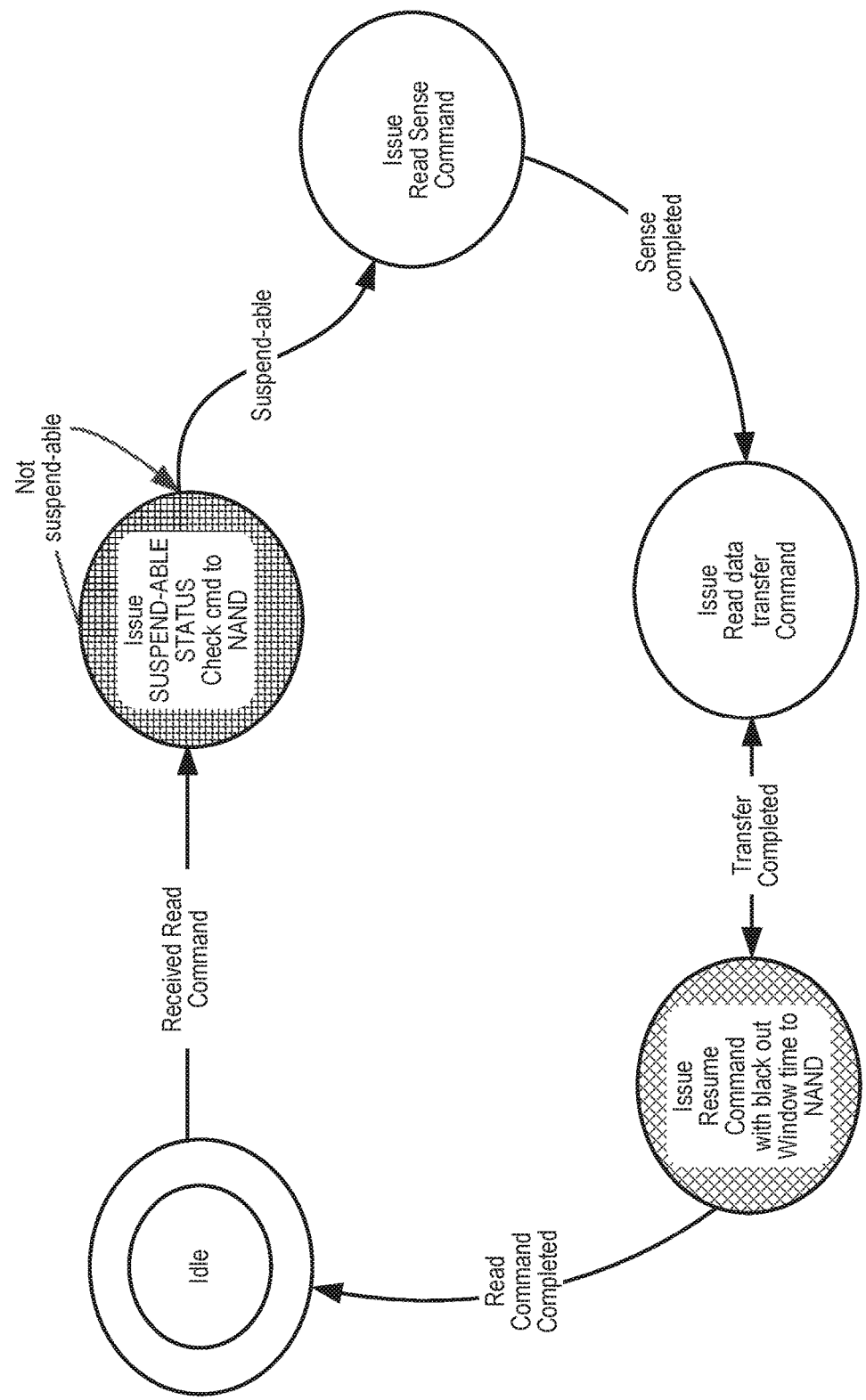
FIG. 10 is a state diagram of an embodiment.
Figure 11:
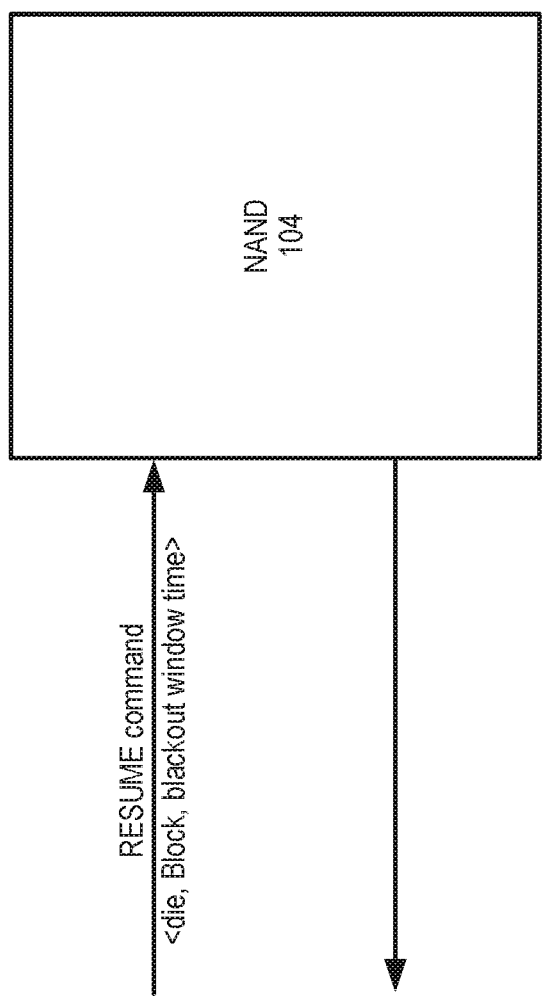
FIG. 11 is a diagram of a memory of an embodiment.
Figure 12:
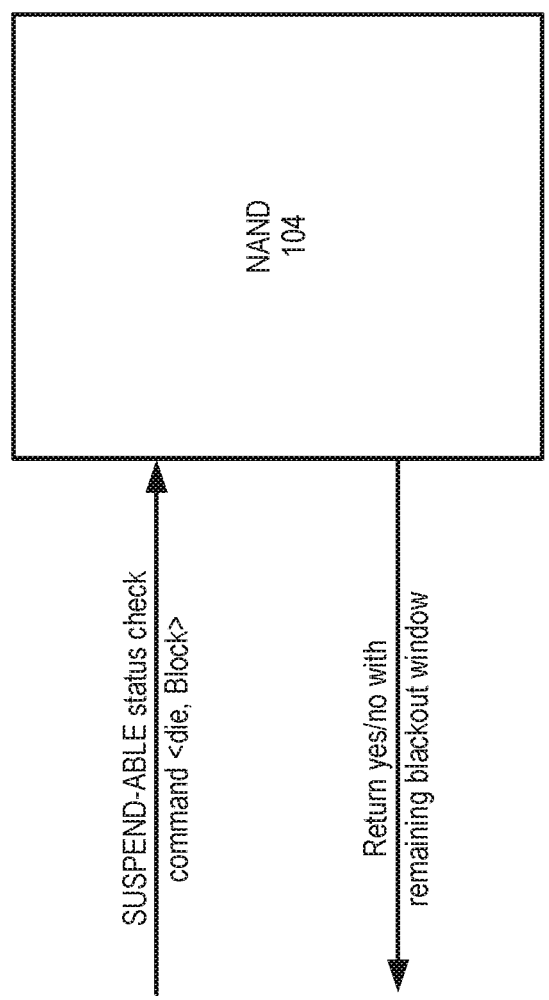
FIG. 12 is a diagram of a memory of an embodiment.

There are many alternatives that can be used with these embodiments. For example, instead of or in addition to implementing the blackout window feature in the controller 102, the blackout window feature can be implemented in the memory 104 itself, which can simplify the controller 102 and be promoted as a unique feature of the memory 104. FIGS. 10-12 illustrate the alternative. FIG. 10 shows a state machine for the built-in blackout window feature, where the patterned states are new states to handle suspending read commands. FIG. 11 shows the memory 104 receiving a resume command with the following parameters: die, block, and blackout window time. The memory 104 is configured to translate the blackout window time to the equivalent program and erase pulse count and is also configured to service only read commands after the blackout window. The blackout window can include the memory's natural resume latency or can be an add-on on top of the memory's resume latency. As shown in FIG. 12, a "suspend-able status check" command (with die and block parameters) can be used to check the active operation's suspend-able status. In response to this command, the memory 104 can return a "yes" or a "no" with the remaining time on the blackout window.

There are many advantages associated with these embodiments. For example, these embodiments can be used to improve the quality of service of a read operation when the storage system 100 is servicing mixed workloads. Performance can be reduced if the workload is read limited and spreading the reads affects the total reads services by the storage system 100. However, there is a significant improvement in read quality of service when the workload is heavy on reads for the number of memory dies in the storage system 100. There may not be an impact when there are enough memory dies to reduce the chance of collision.

Finally, as mentioned above, any suitable type of memory can be used. Semiconductor memory devices include volatile memory devices, such as dynamic random access memory ("DRAM") or static random access memory ("SRAM") devices, non-volatile memory devices, such as ReRAM, electrically erasable programmable read only memory ("EEPROM"), flash memory (which can also be considered a subset of EEPROM), ferroelectric random access memory ("FRAM"), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional (2D) memory structure or a three dimensional (3D) memory structure.

In a 2D memory structure, the semiconductor memory elements are arranged in a single plane or a single memory device level. Typically, in a 2D memory structure, memory elements are arranged in a plane (e.g., in an x-z direction plane) that extends substantially parallel to a major surface of a substrate that supports the memory elements. The substrate may be a wafer over or in which the layer of the memory elements is formed or it may be a carrier substrate that is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A 3D memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements in each column. The columns may be arranged in a 2D configuration, e.g., in an x-z plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the 2D and 3D structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, which are intended to define the scope of the claimed invention. Finally, it should be noted that any aspect of any of the embodiments described herein can be used alone or in combination with one another.

What is claimed is:

1. A storage system comprising:
a memory; and
a controller coupled with the memory and configured to:
receive a read command while the memory is undergoing a program operation, wherein the program operation can be suspended a limited number of times;
calculating a period of time of a blackout window based on the limited number of times that the program operation can be suspended;
in response to the program operation not being suspended more than the limited number of times, suspend the program operation to execute the read command, wherein suspending the program operation instead of waiting for program operation to finish decreases read latency of the read command;
resume the program operation after executing the read command; and
limiting a maximum read latency of subsequent read commands by preventing the program operation from being suspended again for the period of time specified in the blackout window after the program operation resumes after a suspend, wherein the preventing causes suspends of the program operation to be evenly distributed over the program operation and prevents clustering of suspends during early stages of the program operation.

2. The storage system of claim 1, wherein the program operation comprises a plurality of program pulses, and wherein the program operation is suspended during one of the program pulses.

3. The storage system of claim 2, wherein the period of time is long enough to prevent the program operation from being suspended again until after a start of a next program pulse.

4. The storage system of claim 1, wherein the period of time is determined based on at least one memory parameter.

5. The storage system of claim 1, wherein the period of time is long enough to improve a read quality of service.

6. The storage system of claim 1, wherein the memory comprises a quad-level cell memory.

7. The storage system of claim 1, wherein the memory comprises a three-dimensional memory.

8. In a memory of a storage system comprising a controller, a method comprising:
receiving a command from the controller to suspend a program operation to execute a read command, wherein the program operation can be suspended a limited number of times;
receiving a command from the controller to resume the program operation, wherein the command to resume the program operation provides the memory with a blackout window during which the memory is prevented from suspending the program operation again, wherein a period of time of the blackout window is based on the limited number of times that the program operation can be suspended; and
limiting a maximum read latency of a subsequent read command by preventing the program operation from being suspended again for the period of time specified in the blackout window after the program operation resumes after a suspend, wherein the preventing causes suspends of the program operation to be evenly distributed over the program operation and prevents clustering of suspends during early stages of the program operation.

9. The method of claim 8, further comprising translating the period of time in the blackout window to an equivalent program and erase pulse count.

10. The method of claim 8, wherein the program operation comprises a plurality of program pulses, the program operation is suspended during one of the program pulses, and the blackout window is long enough to prevent the program operation from being suspended again until after a start of a next program pulse.

11. The method of claim 8, wherein the blackout window comprises an amount of time that accounts for a natural resume latency of the memory.

12. The method of claim 8, wherein the blackout window comprises an amount of time in addition to a time representing a natural resume latency of the memory.

13. The method of claim 8, wherein the blackout window is long enough to improve a read quality of service.

14. A storage system comprising:

a memory;

means for suspending a program operation to execute a read command, wherein the program operation can be suspended a limited number of times;

means for calculating a period of time of a blackout window based on the limited number of times that the program operation can be suspended;

means for suspending the program operation to execute a read command in response to the program operation not being suspended more than the limited number of times, wherein suspending the program operation instead of waiting for program operation to finish decreases read latency of the read command; and means for limiting a maximum read latency of subsequent read commands by preventing the program operation from being suspended again for the period of time specified in the blackout window after the program operation resumes after a suspend, wherein the preventing causes suspends of the program operation to be evenly distributed over the program operation and prevents clustering of suspends during early stages of the program operation.

\* \* \* \* \*